(12) United States Patent
Desai et al.

(10) Patent No.: US 10,965,490 B2
(45) Date of Patent: Mar. 30, 2021

(54) DATA SERVICE INCLUDING CHANNEL GROUP

(71) Applicant: AT&T INTELLECTUAL PROPERTY II, L.P., Atlanta, GA (US)

(72) Inventors: Bhavesh N. Desai, Livingston, NJ (US); Nemmara K. Shankaranarayanan, Bridgewater, NJ (US); David Hilton Shur, Holmdel, NJ (US); Aleksandra Smiljanic, Atlantic Highlands, NJ (US); Todd J. Totland, Tinton Falls, NJ (US); Jacobus E. Van der Merwe, New Providence, NJ (US); Sheryl Leigh Woodward, Holmdel, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 142 days.

(21) Appl. No.: 16/014,249

(22) Filed: Jun. 21, 2018

(65) Prior Publication Data

US 2018/0302236 A1  Oct. 18, 2018

Related U.S. Application Data

(63) Continuation of application No. 14/471,879, filed on Aug. 28, 2014, now Pat. No. 10,009,190, which is a (Continued)

(51) Int. Cl.
H04L 12/28   (2006.01)
H04L 25/14   (2006.01)
H04L 29/06   (2006.01)

(52) U.S. Cl.
CPC ...... *H04L 12/2861* (2013.01); *H04L 12/2801* (2013.01); *H04L 12/2856* (2013.01);
(Continued)

(58) Field of Classification Search
CPC ............ H04L 12/2861; H04L 12/2801; H04L 12/2856; H04L 12/2898; H04L 25/14; H04L 29/06
See application file for complete search history.

(56) References Cited

U.S. PATENT DOCUMENTS 6,128,322 A * 10/2000 Rasanen .............. H04B 7/2659
                                                                                370/536
6,169,569 B1 * 1/2001 Widmer .................. H03J 5/244
                                                                                348/731
(Continued)

*Primary Examiner* — Donald L Mills
(74) *Attorney, Agent, or Firm* — Guntin & Gust, PLC; Atanu Das

(57) ABSTRACT

A method includes dividing, at a cable modem termination system, a transmit stream into multiple data streams. The multiple data streams include a first data stream and a second data stream. Each of the multiple data streams has a lower bit rate than a bit rate of the transmit stream. The method includes transmitting, via the cable modem termination system, the first data stream over at least a first channel of a group of channels. The method also includes transmitting, via the cable modem termination system, the second data stream over at least a second channel of the group of channels. The group of channels supports traffic to a plurality of destinations. The first channel and the second channel are frequency-division multiplexed channels.

20 Claims, 7 Drawing Sheets

Related U.S. Application Data continuation of application No. 13/177,087, filed on Jul. 6, 2011, now Pat. No. 8,855,147, which is a continuation of application No. 12/766,085, filed on Apr. 23, 2010, now Pat. No. 8,000,331, which is a continuation of application No. 12/535,147, filed on Aug. 4, 2009, now abandoned, which is a continuation of application No. 11/215,898, filed on Aug. 31, 2005, now abandoned, which is a continuation of application No. 09/924,617, filed on Aug. 8, 2001, now Pat. No. 6,993,050.

(60) Provisional application No. 60/275,665, filed on Mar. 14, 2001.

(52) U.S. Cl.
CPC .......... H04L 12/2898 (2013.01); H04L 25/14 (2013.01); H04L 29/06 (2013.01); *H04L 69/14* (2013.01)

(56) References Cited

U.S. PATENT DOCUMENTS

| | | | | |
|---|---|---|---|---|
| 6,240,274 B1* | 5/2001 | Izadpanah | ............ | H04J 3/0685 370/277 |
| 6,795,426 B1* | 9/2004 | Raleigh | ............... | H04L 27/2647 370/210 |
| 6,993,050 B2* | 1/2006 | Desai | ................... | H04L 12/2801 370/536 |
| 7,068,597 B1* | 6/2006 | Fijolek | ............... | H04L 41/0853 370/230 |
| 7,113,484 B1* | 9/2006 | Chapman | ............ | H04L 12/2801 370/252 |
| 7,499,453 B2* | 3/2009 | Carlson | ............... | H04L 12/2801 370/395.2 |
| 7,990,977 B2* | 8/2011 | Desai | ................... | H04L 12/2801 370/395.2 |
| 8,000,331 B2* | 8/2011 | Desai | .................. | H04L 12/2801 370/395.2 |
| 8,989,591 B2* | 3/2015 | Kauffeldt | ............ | H04J 14/0275 398/135 |
| 2002/0131426 A1* | 9/2002 | Amit | .................... | H04L 12/2801 370/401 |
| 2008/0010358 A1* | 1/2008 | Jin | ...................... | H04L 41/0803 709/207 |
| 2008/0232801 A1* | 9/2008 | Arnold | ................ | H04L 41/0803 398/58 |
| 2011/0072119 A1* | 3/2011 | Bronstein | ............. | H04L 41/046 709/222 |
| 2011/0131624 A1* | 6/2011 | Wu | ...................... | H04L 41/0226 725/111 |
| 2012/0030320 A1* | 2/2012 | Diab | ....................... | H04L 12/12 709/220 |
| 2014/0064267 A1* | 3/2014 | Thi | ......................... | H04B 3/23 370/352 |

\* cited by examiner

FIG. 2

DATA SERVICE INCLUDING CHANNEL GROUP

CLAIM OF PRIORITY

This application claims priority to, and is a continuation of, U.S. patent application Ser. No. 14/471,879, filed on Aug. 28, 2014; which is a continuation of U.S. patent application Ser. No. 13/177,087, filed on Jul. 6, 2011, now U.S. Pat. No. 8,855,147; which is a continuation of U.S. patent application Ser. No. 12/766,085, filed on Apr. 23, 2010, now U.S. Pat. No. 8,000,331; which is a continuation of U.S. patent application Ser. No. 12/535,147, filed on Aug. 4, 2009, now abandoned; which is a continuation of U.S. patent application Ser. No. 11/215,898, filed on Aug. 31, 2005, now abandoned; which is a continuation of U.S. patent application Ser. No. 09/924,617, filed on Aug. 8, 2001, now U.S. Pat. No. 6,993,050; which claims the benefit of U.S. Provisional Patent Application No. 60/275,665 filed on Mar. 14, 2001; the disclosures of each of which are hereby expressly incorporated by reference in their entirety.

FIELD OF THE DISCLOSURE

The present disclosure relates to a data service that includes a channel group.

BACKGROUND

As is known in the art, in addition to the transmission of television signals, it has been recognized that a cable network can also be used to transmit other types of data between remote locations. Thus, the cable network of the cable industry may be used as an alternative to communicating data via conventional telephone networks, such as the public switched telephone network (PSTN) for example.

In this regard, cable networks are currently being used to transmit data to and from subscribers located at remote locations. Each subscriber location includes a cable modem (CM) capable of communicating with a cable modem termination system (CMTS) located at a central cable station (or headend). The headend provides television signals to customers, as well as modulated data signals to each subscriber modem. Cable connections between the CMTS at the central cable station and the subscriber modems currently exist so that data packets such as internet protocol (IP) datagrams can be transmitted between the central cable station and each of the subscriber modems.

In general, each connection between a subscriber modem and the central cable station includes two channels, an upstream channel on which signals having one frequency range propagate and a downstream channel on which signals having a different frequency range propagate. The downstream channel is used to transmit data from the central cable station to the subscriber modems, and the upstream channel is used to transmit data from the subscriber modems to the CMTS at the central cable station. Thus, the CMs are coupled in communication with the CMTS to receive information on a so-called "downstream channel" and to communicate information to the CMTS on a so-called "upstream channel."

Particular characteristics (e.g., frequency, power levels, etc) of the upstream channel are determined at the time the CM is initialized. The CM at the user or subscriber site typically connects to a personal computer (PC) through an Ethernet port while the CMTS typically enables connection to a network through a high speed Ethernet interface, although other types of network connection are possible.

As is also known, The Radio Frequency Interface Specification, Data-over-cable Service Interface Specifications, available from the Cable Television Laboratories, Inc. (DOCSIS) describes operating parameters for a cable modem network. DOCSIS is the defacto standard for cable modem products in North America. To carry data downstream, from the headend to the subscribers, a single 6 MHz-wide radio frequency (RF) channel is used.

The 6 MHz channel is located in the 55 to 860 MHz frequency band. The RF modulation format used over this channel is typically 64- or 256-QAM. A CMTS resides in the headend. The CMTS typically contains multiple line cards, each capable of transmitting 30 to 40 Mbps downstream. In practice, FEC reduces this number slightly and 27 Mbps is typically achieved over a 64-QAM channel. This downstream channel will be shared by the subscribers within the serving area of that line card. Cable modems receive the data, and transmit the user's data to his computer or LAN via a 10 or 100 BaseT connection.

On the upstream channel, data from the user's local area network (LAN) is transmitted to the headend using an RF channel in the 5-42 MHz band of the upstream channel. Typically, quadrature phase-shift keying (QPSK) transmission is used, although the DOCSIS standard includes more bandwidth efficient formats. Such efficient modulation formats typically can be used in CATV systems having a relatively small amount of interfering signals and noise. The CMTS line card coordinates the upstream data channels, so that only one cable modem transmits at a time. Frequently, a single CMTS card will coordinate multiple upstream channels.

As 100 Mbps fast-Ethernet becomes more popular, consumers will develop a growing desire for cable-modem connections that are faster than currently available cable-modem connections. There are a variety of ways that a user's bit rate can be improved. One approach to improve the performance of a cable-modem service is to segment the serving area so that fewer users share a channel. While this increases the user's average bit-rate, and provides a better user-experience for streaming media applications, the peak rate remains unchanged. For "bursty" applications, improving the peak rate not only reduces the time it takes to download large files, it has the additional advantage of allowing more users to share the limited available bandwidth without compromising the users' service. The larger the bandwidth being shared by a population of users with the same traffic demand, the more efficiently the bandwidth can be used.

As is also known, there exist a variety of techniques for improving the peak rate. These techniques can be broken into several basic categories. One category of techniques includes those techniques that utilize a more spectrally-efficient modulation format. One problem with this category of solutions, however, is that this places strenuous demands on the system's signal-to-noise ratio (SNR), which current systems might not be able to meet. Another category of techniques includes those techniques that utilize serial transmission over channels broader than those specified in the current DOCSIS standards. This approach would allow an increase of the symbol rate but would require that agreements be reached concerning new allocations of spectrum, and the design of new electronic systems capable of transmitting at these higher rates.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 is a block diagram of an upstream path of a transmission system;

The use of the same reference symbols in different drawings indicates similar or identical items.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
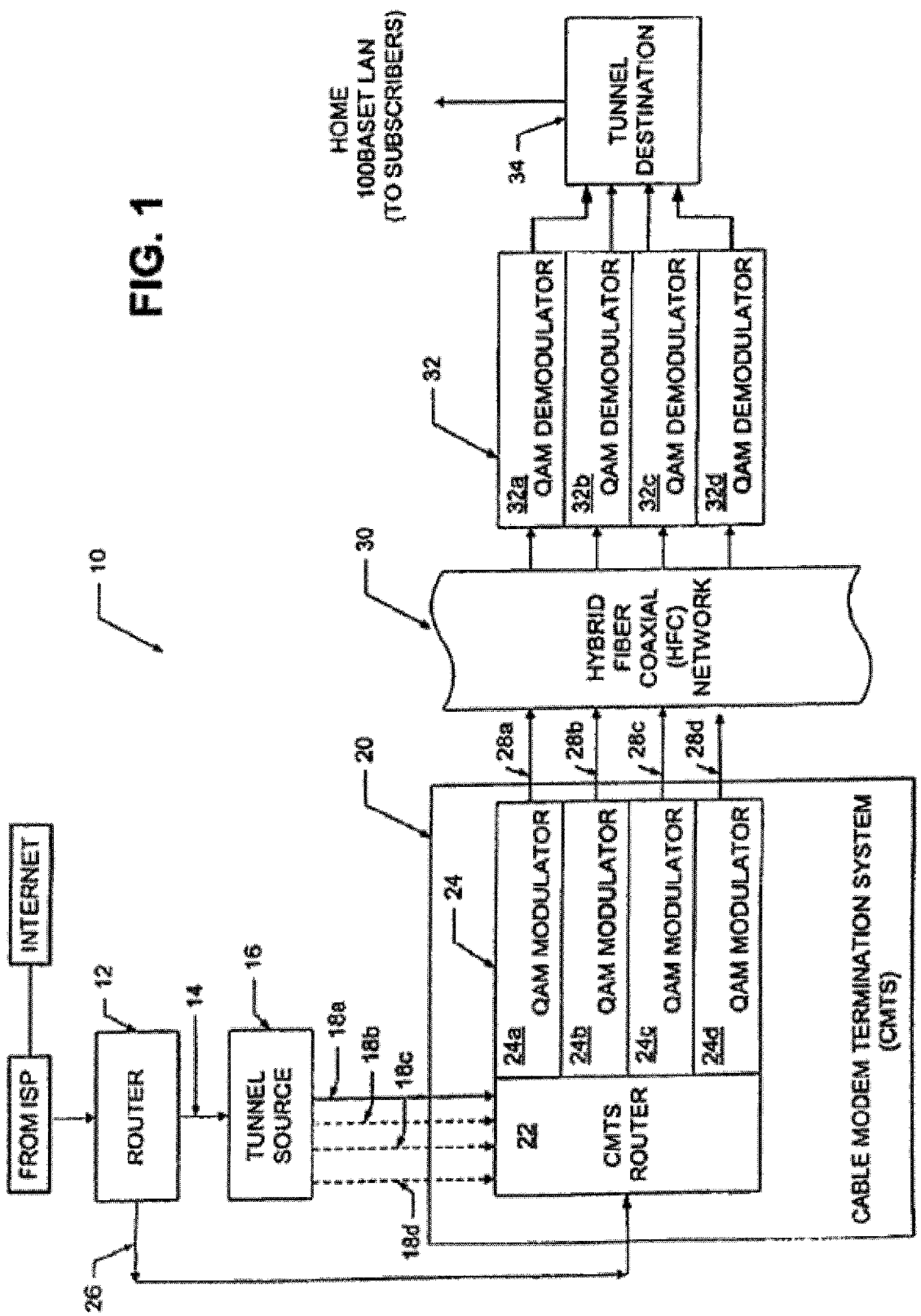
FIG. 1 is a block diagram of a downstream path of a transmission system.

Referring now to FIG. 1, a downstream path of a transmission system 10 includes a first router 12 coupled to a tunnel source (also referred to as a sending tunnel end-point) 16 through a first signal path 14 (referred to hereinbelow as a FastChannel path). Tunnel source 16 is coupled to a cable modem termination system (CMTS) 20 through a second signal path 18 here shown as signal paths 18a-18d. It should be appreciated that the tunnel source 16 can functionally reside in a separate box upstream of the CMTS 20 as shown in FIG. 1. Alternatively, however, the tunnel source 16 can functionally reside within the CMTS 20 or the router 12.

The CMTS 20 includes a CMTS router 22 and a plurality of quadrature amplitude modulators (QAMs) 24a-24d generally denoted 24. Router 12 is also coupled to the CMTS 20, and in particular to the CMTS router 22, via a signal path 26. The purpose of the signal paths 14 and 26 will next be described in general overview.

In the system of the present disclosure, a packet encapsulation and tunneling procedure can be used which includes two different IP address spaces associated with IP over cable offerings. A first address space (referred to as an L address space) is for existing single-channel users operating in accordance with the Data Over Cable Standard Interface Specification (DOCSIS). A second address space (referred to as an F address space) is for FastChannel users (i.e. users of the protocol described herein). The router 12 is adjacent to and upstream of the CMTS 20, such that, if a packet having a destination address in the L address space is received, the router 12 directly routes the packet to the CMTS 20 via signal path 26 without passing through the tunneling node 16. If, however, a packet having a destination address in the F address space is received, the router 12 forwards the packet to the tunnel source 16. Tunnel source 16 receives data provided thereto from the router 12 and divides the serialized data stream into a plurality of parallel channels that are fed via the signal path 18a to the CMTS 20.

It should be noted that in FIG. 1, signals paths 18b-18d are shown in phantom to indicate that the parallel signals are logically separate but can be transmitted on a single physical signal path (e.g. a single wire) such as the signal path 18a.

Whether fed to the CMTS router 22 via the FastChannel path 14 or via the legacy path 26, the CMTS router 22 provides each of the signals to one of a plurality of modulators 24a-24d generally denoted 24. In this particular embodiment, where it is desirable to be compatible with the DOCSIS protocol, the modulators 24 are preferably provided as quadrature amplitude modulators (QAMs). It should be appreciated, however, that in other embodiments it may be desirable or even necessary to utilize other types of modulators including but not limited to quadrature phase-shift keyed (QPSK), spread spectrum, orthogonal-frequency-division multiplexed (OFDM) and code-division multiple-access (CDMA) modulators.

A plurality of parallel channels 28a-28d is formed via the CMTS router 22 and the QAM modulators 24a-24d. Each of the modulators 24 modulates the signal fed thereto and provides the so-modulated signal to a corresponding one of a plurality of radio frequency (RF) channels in a hybrid fiber coaxial (HFC) network 30. It should be understood that the parallel channels may or may not be adjacent one another in frequency. HFC 30 corresponds to a cable network utilizing a combination of optical fibers and coaxial cables of the types known to be used in the cable television industry for transmission of television signals. Alternatively, HFC 30 could be replaced with a wireless system, wherein signals are transmitted over the air, typically using the MMDS band, rather than over HFC plant as described for example, in AT&T Labs broadband fixed wireless field experiment, Byoung-Jo Kim; Shankaranarayanan, N. K.; Henry, P. S.; Schlosser, K.; Fong, T. K. IEEE Communications Magazine, Volume: 37 Issue: Oct. 10, 1999 page(s) 56-62.

Signals are provided via the parallel channels and the HFC 30 to a corresponding plurality of demodulators 32 here provided as quadrature amplitude modulation (QAM) demodulators 32. The demodulators 32 provide demodulated signals to a tunnel destination 34 (also referred to as a destination end-point) which receives the demodulated tunnel source signals and re-serializes the data. Thus, a plurality of channels is coupled between the tunnel source 16 and the tunnel destination 34.

The tunnel destination 34 is coupled to personal computers (PCs) or other devices of a user or subscriber, typically via a 100 baseT local area network (LAN) connection.

In one embodiment, each of the channels 28a-28d is provided as an RF channel between the send and receive sites and virtual links are established over each of the RF channels. Packets are distributed over these virtual links in a controlled fashion. Thus, virtual links can be established over each RF channel between send and receive sites. As used herein the term "virtual link" means a logical connection between a sender and a receiver, where both ends are addressable via some type of address. Data is sent via packets or link layer frames, which contain the sending and receiving address (as well as other information) in a packet or frame header. Many virtual links can share the same physical link. In one embodiment, the virtual links are established via a MAC-layer process. Those of ordinary skill in the art will appreciate that the MAC layer is also known as an OSI layer 2.

In another embodiment, the virtual links are provided via an Internet Protocol IP within IP encapsulation or tunneling process. It should be appreciated, however, that other tunneling processes including but not limited to IP within User Datagram Protocol (UDP), IP within TCP can also be used. Technically it is possible to encapsulate IP within the network layer packets of other protocols such as X.25. It should be understood that as used herein, the term "IP tunneling" includes IP over TCP and UDP or any other mechanism by which IP is the inside layer, and IP, TCP or UDP is the outside layer.

For the illustrative embodiment IP encapsulation within IP, and IP tunneling are used. This technique allows an incoming IP packet to be placed in the payload field of an encapsulation packet having source and destination address headers which point to the respective end-points of the tunnel. When received at the destination tunnel, the encapsulation header is stripped off, and the original packet is forwarded by the tunnel end-point toward the original destination. The sending tunnel end-point can functionally reside in a separate box upstream of the CMTS. The receiving tunnel end-point will reside in a box, which terminates the N cable modem MAC interfaces. Each cable modem interface is assigned an IP address and multiple tunnels are created from the sending end-point to the IP address endpoints of each cable modem.

The packets are distributed over the virtual links in a controlled fashion. In one embodiment, control over the packet distribution is provided by load balancing. As used herein, the term "load balancing" includes but is not limited to adjustment of system characteristics to adjust and fix congestion situations or to avoid them. Load balancing can be achieved via monitoring or scheduling techniques. When using a monitoring technique, system characteristics are adjusted once a particular condition or state, such as an overload condition, is detected. When using a scheduling technique, on the other hand, system characteristics (e.g. quality of service-QOS) are monitored and system adjustments are made prior to an overload condition occurring.

Each virtual link (both upstream and downstream) may be shared by multiple data flows, where data flows might have the same or different sources and destinations. Scheduling policies provide QoS to these flows, primarily bandwidth and delay. Flows carrying interactive applications (including but not limited to voice calls and video conferencing) have stringent delay requirements that should be fulfilled. For the applied scheduling policy and existing flows with their QoS requirements, resources will be assigned to a new flow with the specified QoS requirements if they are available. DOCSIS defines the admission control procedure: how the resource is requested by the higher layer protocols, and how the information about the resource availability is stored in CMTS. DOCSIS also defines QoS parameters that applications may specify when requesting the resource. In accordance with the present technique, the resource will be assigned to users that utilize multiple virtual links with the higher probability. The QoS capabilities of IP that is likely to carry data in the access network in question are currently under development.

In some embodiments, each of the plurality of RF channels is adjacent in frequency while in other embodiments, each of the plurality of RF channels is not adjacent in frequency. Allowing the channels to be not adjacent in frequency permits greater flexibility when interworking with an existing cable plant which may already contain a high occupancy of video channels. Using adjacent channels may simplify the modem design, as a single down-converter and digital-to-analog converter may be used. The adjacent channels can then be separated using digital techniques.

There are various alternative methods for utilizing the bandwidth of parallel channels, namely: (1) the bit-level, (2) the media access control (MAC) frame level, and (3) the IP level. It should be appreciated that since the bit-level method would not be compatible with supporting simultaneously single-channel transmission and multiple-channel transmission it may not be appropriate for this application.

The MAC frame level technique involves distributing the MAC transmission frames across the multiple channels, and recombining the frames into a single stream at the modem. The IP packet level technique involves distributing the packets across the multiple channels, and recombining the packets into a single stream at the modem. The differences between these two alternatives are that in the frame-level case, a channel number/frequency band must be mapped to a different MAC destination address, while in the packet level case a channel number/frequency band must be mapped to a different IP address. The frame level method integrates the recombining of packets with the cable modem. In contrast, the packet level method allows the tunnel end-point to be placed "outside" a DOCSIS cable modem. It should be appreciated that in this approach, the FastChannel modem could be constructed from multiple DOCSIS cable modems and a tunneling end-point. Similarly the distribution of packets is most natural inside the CMTS with the frame method, and may take place outside the CMTS with the packet method. The frame level method will allow relatively tight integration into the CMTS and modem components and therefore may be most cost-effective in the long run. It should be noted that for this option, in order to incorporate the relevant functionality changes that one would need to make to the CMTS, the FastChannel modems could not be created by simply combining together several current DOCSIS cable modems. The packet level method, while possibly not optimal in the long run, allows use of existing cable modems and CMTS without requiring modification to the CMTS.

The packet level method allows the tunneling end-points to be separate from the CMTS and DOCSIS cable modems. Furthermore, a tunneling end-point that is separate from the CMTS can serve multiple CMTS. This may make it easier to add capacity to a system, as additional DOCSIS channels could be added, and served with the FastChannel protocol, without needing to upgrade the previously installed CMTS.

In one example, assume there are N parallel channels assigned to FastChannel cable modems. In this case CMTS 20 maintains N separate output queues, one for each RF channel. In FIG. 1, four queues 28a-28d are shown. Frames are thus placed into one of the four output channels as they arrive.

It should be appreciated that it is important to minimize the fraction of out-of-sequence packets. If packet sequence numbers were employed (by means of a sequence number field in the encapsulation header), out-of-sequence packets can be eliminated. This is the approach taken with the known PPP Multi-link Protocol (MLP). While the use of PPP MLP would lead to the desired result, the PPP protocol is overkill for the job at hand. It is thus suggested that it is possible to obtain a satisfactory out-of-sequence packet minimization through a suitably chosen queue management algorithm, and without the use of sequence numbers in an encapsulation header. However some care is needed in the algorithm selection. Placing frames into queues in a round-robin fashion could lead to mis-ordering. For example, suppose one queue is backed-up and another is empty, and the first frame is placed in the backed-up queue, and the second frame placed in the empty queue. It is possible that in this case the second frame may arrive at the receiver before the first frame. To address this particular problem, an alternative queuing discipline comprises insertion of frames into the shortest queue, where the "shortest" metric should represent frame service time. It is possible to estimate the frame service time based on an appropriate combination of byte and packet counts in the output buffer.

On the receiving side in the modem, a frame "serialization" function is required, which simply plays out received frames serially into the output in the MAC-level driver, in the order in which they were received. Optimally, order should be measured as the time at which the first byte of the frame is received rather than the last byte, in order to further reduce the possibility of frame mis-ordering.

In the case of packet level parallel transmission, IP encapsulation within IP/IP tunneling can be used. This technique allows an incoming IP packet to be placed in the payload field of an encapsulation packet, having source and destination address headers that point to the respective end-points of the tunnel. When received at the destination tunnel, the encapsulation header is stripped off, and the original packet is forwarded by the tunnel end-point toward the original destination. The proposed use of this technique is described in detail below in conjunction with FIG. 5.

The tunnel destination 34 can reside in a box, which terminates the N cable modem MAC interfaces. Each cable modem interface is assigned an IP address, and multiple tunnels are created from the sending end-point (e.g. tunnel source 16), to the IP address endpoints of each cable modem. A queue-scheduling algorithm is employed at the end point of the sending tunnel 16, which uniformly distributes the IP packets over each tunnel.

The choice of queue scheduling algorithm to minimize mis-ordering is again relevant. One difference between the IP and MAC approaches is that in the IP-based approach, the tunnel does not have access to the output buffer state on the CMTS itself, only on the tunnel machine. The tunnel buffer state may not be the same as the CMTS buffer state. If it turns out that packet sequence problems may arise because of this difference, it may be necessary to add a sequence number field to the encapsulation header.

Figure 1A:
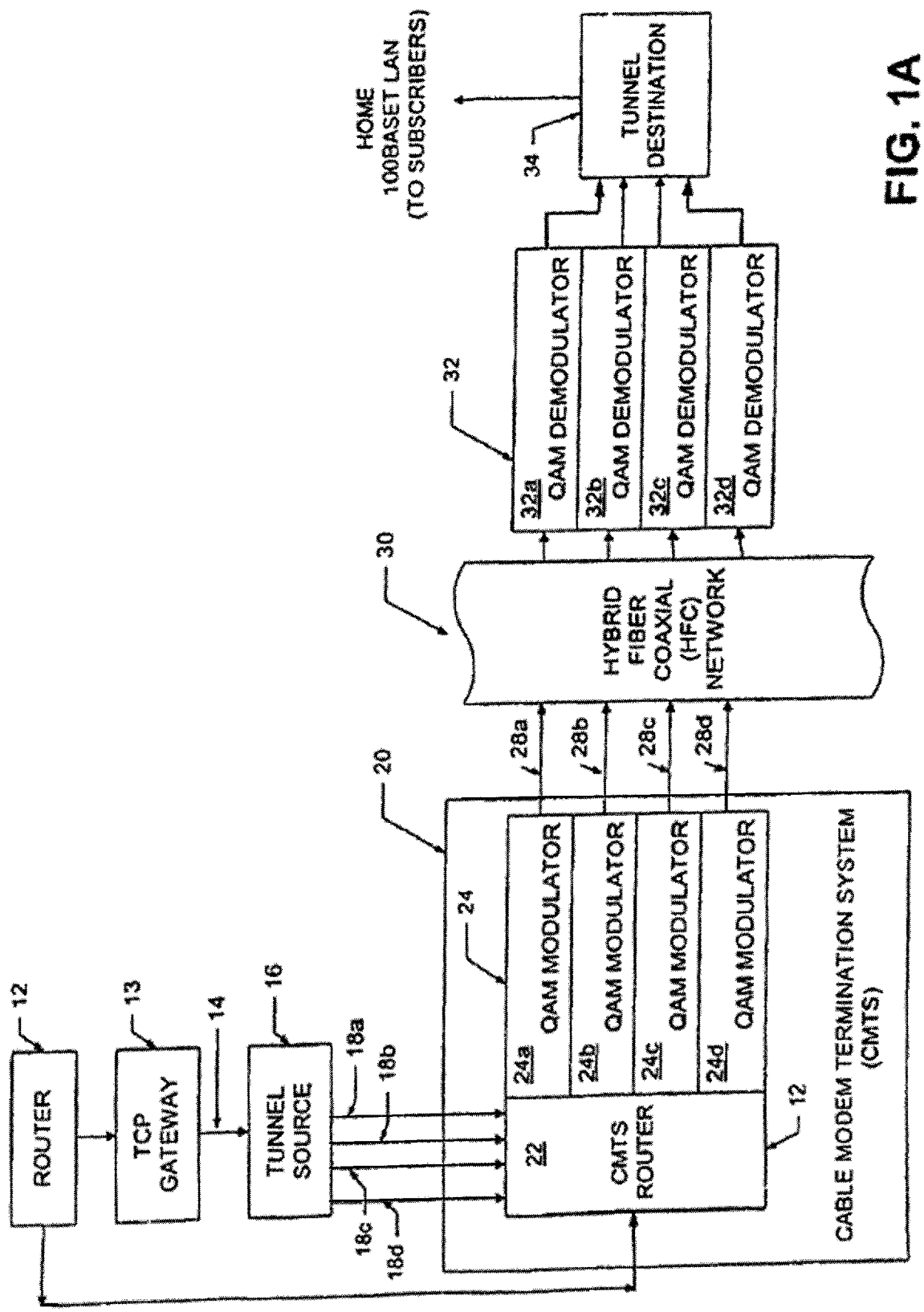
FIG. 1A is a block diagram of a downstream path of a transmission system that includes a Transmission Control Protocol (TCP) gateway.

Referring now to FIG. 1A, in the case where the FastChannel system is implemented in a downstream path but not an upstream path, the downstream transmission rate of TCP is limited by the speed at which an acknowledgement is received from the upstream module. To increase this speed, a known transmission control protocol (TCP) gateway 13 is interposed between the router 12 and the tunnel source 16. In this optional embodiment, the TCP gateway transparently terminates the TCP connection, provides acknowledgements back to the sending node, prior to them being received by the TCP receiver. The sender is therefore able to grow its transmission window faster and send data faster than it would otherwise be able to.

Figure 2:
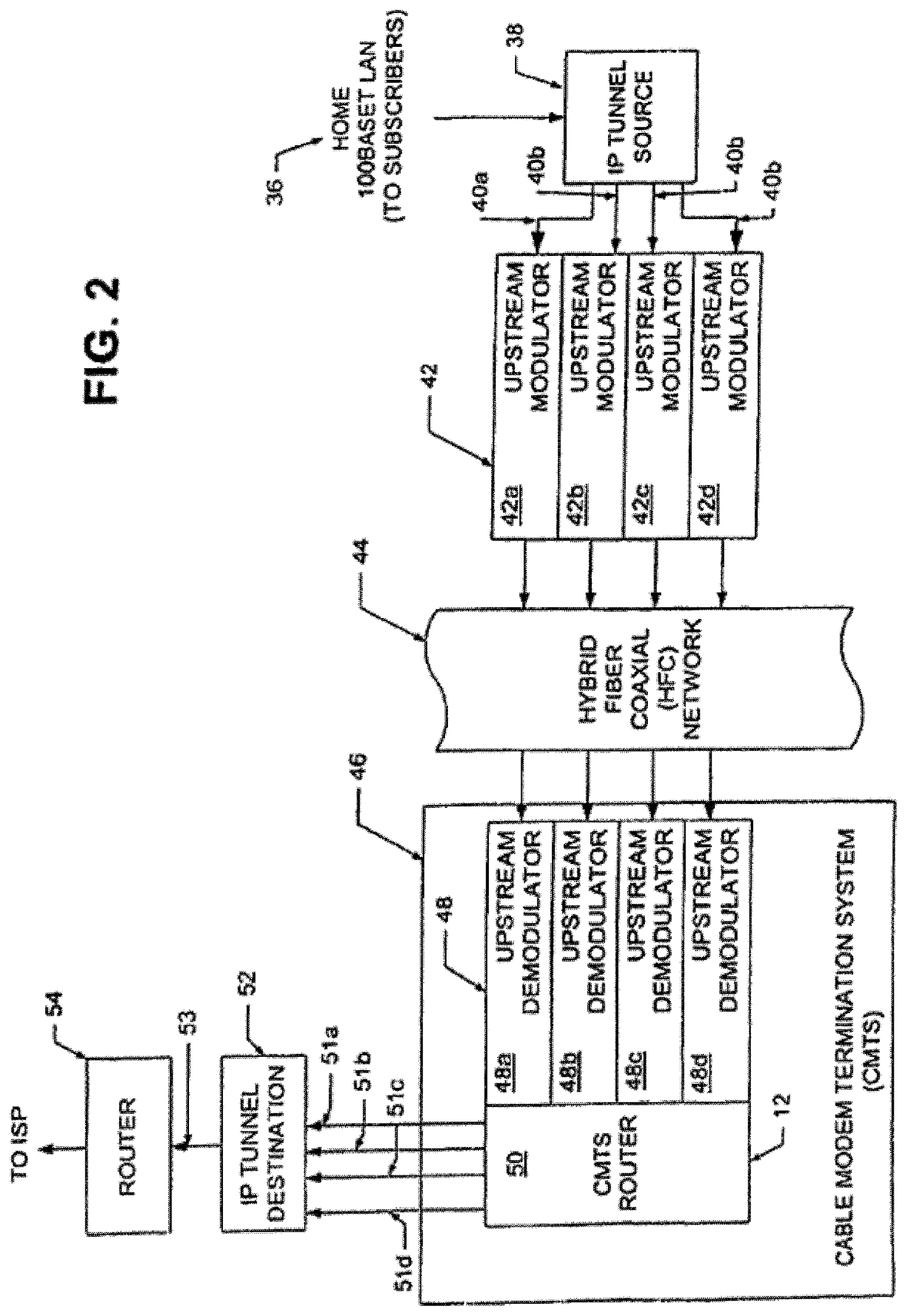

Referring now to FIG. 2, an upstream path of a transmission system such as the transmission system 10 described above in conjunction with FIGS. 1 and 1A includes subscriber systems 36 that transmit signals through IP tunnel sources 38. The tunnel sources 38 form a plurality of channels 40a-40d each of which are coupled to one of a plurality of upstream modulators 42a-42d which in turn are coupled to an HFC 44.

The upstream plurality of parallel channels is coupled to a CMTS 46 and in particular, the parallel channels are coupled to corresponding ones of a plurality of demodulators 48a-48d, generally denoted 48. The upstream demodulators provide the signal to a CMTS router 50 which in turn provides the signals to an IP tunnel destination 52 and subsequently to a router 54.

In this manner signals can be transmitted in the upstream direction within the transmission system.

The MAC frame level technique and the (IP) packet level technique for utilizing the bandwidth of the parallel channels discussed above in the downstream case can also be used in the upstream case.

Figure 3:
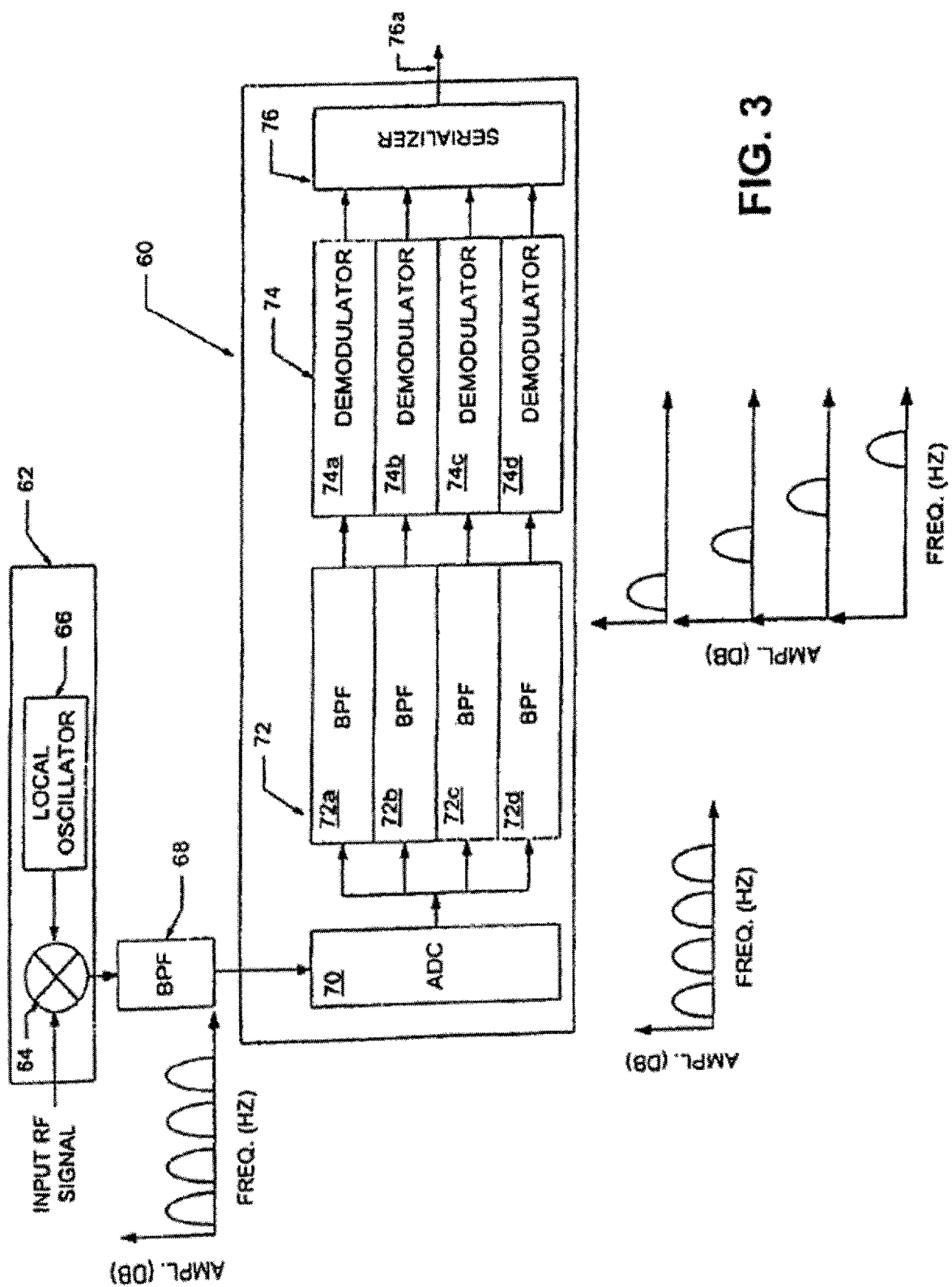
FIG. 3 is a block diagram of a demodulator portion of a FastChannel modem.

Referring now to FIG. 3, a demodulator 60 of the type that may be used in a modem coupled to receive signals from a FastChannel signal path includes a tuner 62 provided from a downconverter module 64 having a local oscillator (LO) 66 coupled thereto. The downconverter module 64 receives RF signals at a first port thereof and an LO signal at a second port thereof and provides an output signal having a frequency equal to the difference between the frequencies of the RF signal and the LO signal.

It should be appreciated that the demodulator embodiment shown in FIG. 3 requires that the parallel channels be adjacent to one another. It should also be understood that other demodulator embodiments may not require that the parallel channels be adjacent one another.

The tuner, band pass filter and ADC can be provided having performance characteristics that are similar or in some instances even identical to those used in serial modems.

The downconverter module output signal is provided to a filter 68 having a band pass filter characteristic. The so-filtered signal is then fed to an input port of an analog to digital converter (ADC) 70, which receives the analog signal at an input thereof and provides at an output port thereof a stream of bits which represents the analog signal fed thereto.

The ADC 70 is followed by processors 72a-72d generally denoted 72 each of which simulates a filter having a band pass filter characteristic. Thus, processors 72a-72d correspond to digital filters. In one embodiment, the filters are provided having a 5 megahertz (MHz) bandwidth.

Each band-pass filter 72a-72d is followed by processors 74a-74d, generally denoted 74, which perform a demodulation process. In one embodiment, processors 74a-74d perform 5 Msymbols/sec QAM demodulation. It should be understood that although multiple processors are shown, this does not mean that multiple chips would be required. It should also be understood that the processor requirements of this modem may be easier to meet than those of a demodulator used in a serial modem, as a band-pass filter is rather simple computation, and the symbol rate of each QAM channel is lower. Thus, a single integrated circuit or "chip" can contain multiple demodulators and digital filters.

The demodulators 74 provide the filtered, demodulated signal to a serializer 76. Serializer 76 receives the signals in parallel from the demodulators 74 and re-serializes the packets to provide a serial signal at an output port 76a.

Figure 4:
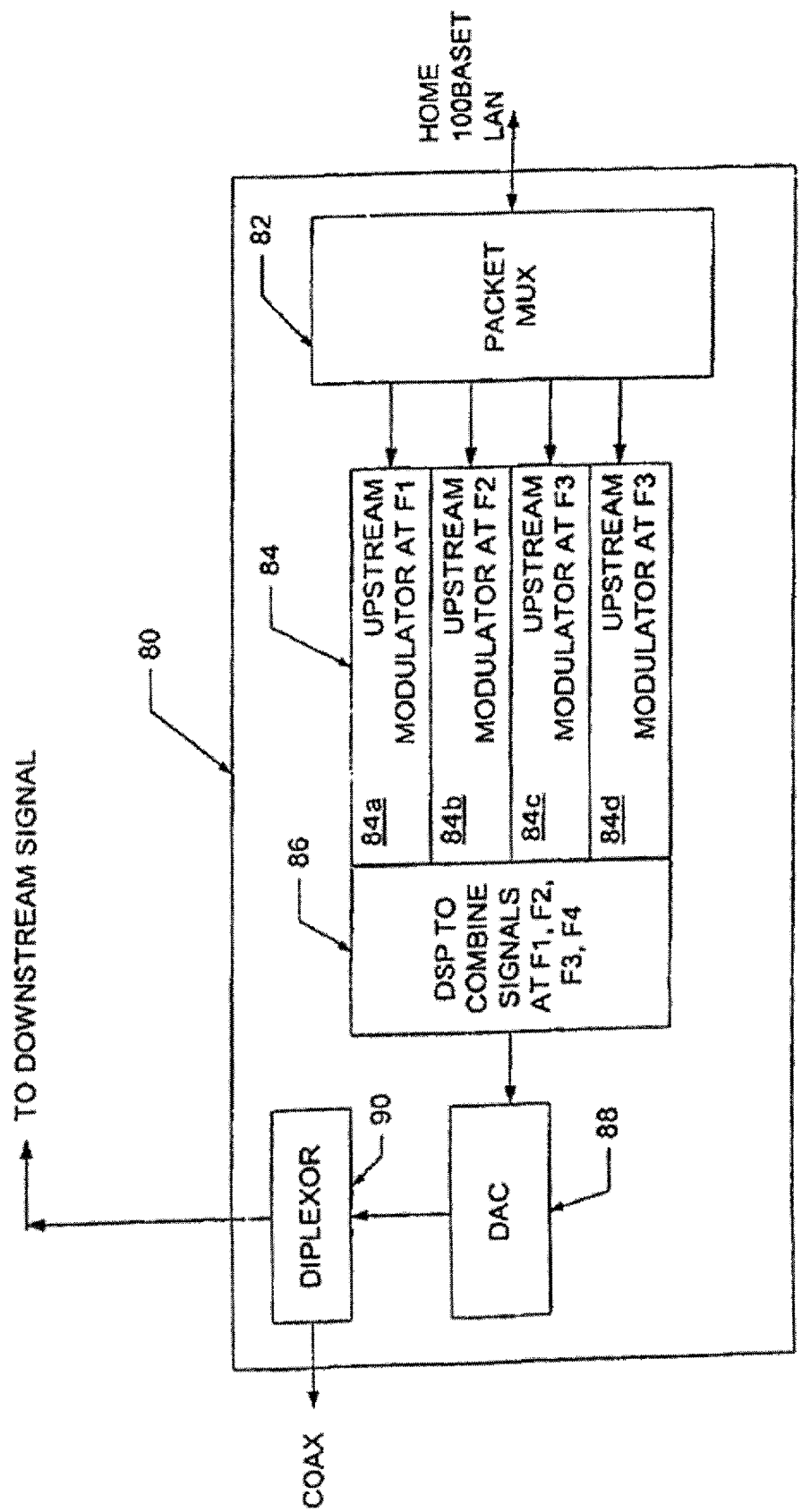
FIG. 4 is a block diagram of a modulator portion of a FastChannel modem.

Referring now to FIG. 4, a modulator portion 80 of a modem includes a packet inverse multiplexor (mux) 82 adapted to receive signals from a user. In this particular example the inverse mux 82 is coupled to a home 100 base T LAN. The inverse mux 82 provides signals to a plurality of upstream modulators 84a-84d, generally denoted 84. Each of the modulators 84a-84d modulates the signals fed thereto at a different frequency, designated F1-F4 in FIG. 4.

The modulators 84 provide signals to a digital signal processor DSP 86 which combines the signals at frequencies F1-F4. The DSP 86 provides a stream of bits to a digital to analog converter (DAC) 88 which receives the bit stream and generates a corresponding analog signal at an output port thereof. The analog signal is fed from the DAC 88 to a diplexor 90. Diplexor 90 is adapted to provide signals to one of the coax signal port and a downstream signal port. The diplexer 90 sends the upstream signals, which are within a first frequency band (typically 5-42 MHz) to the headend via the HFC infrastructure. It simultaneously sends the downstream signals within a second frequency band (typically this frequency band begins at 55 MHz and ends somewhere between 500 MHz and 900 MHz) to the demodulator portion of the FastChannel modem.

Figure 5:
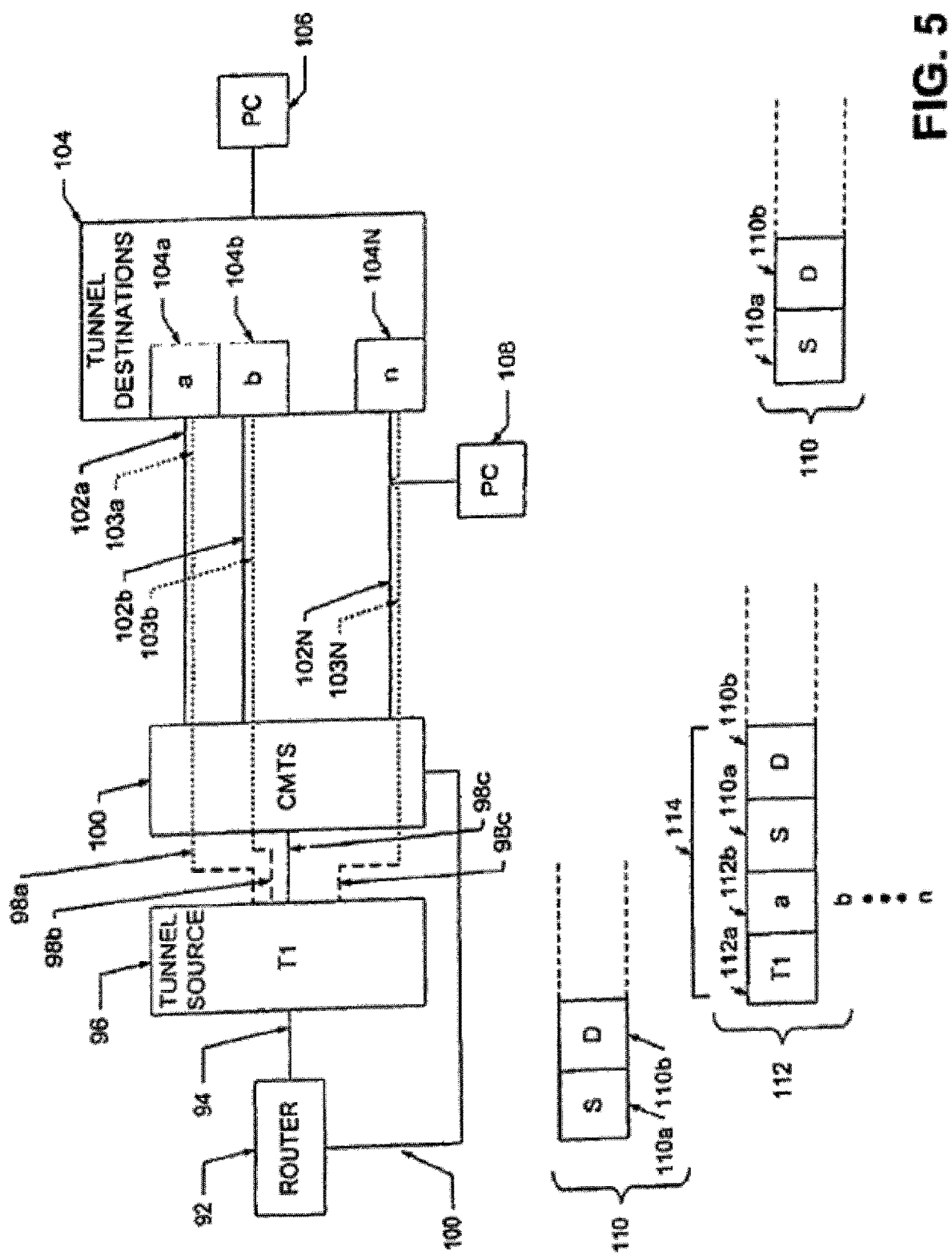
FIG. 5 is a block diagram which illustrates bundling Data Over Cable Standard Interface Specification (DOCSIS) channels via internet protocol (IP) tunneling.

Referring now to FIG. 5, a system for processing data in a series of parallel channels includes a router 92 coupled via a signal path 94 to a tunnel source 96 and via a signal path 98 to a CMTS 100. The CMTS is coupled via a plurality of cable channels 102a-102N to a like plurality of tunnel destinations 104a-104N generally denoted 104 on a machine. The tunnel destinations are coupled to a processor or computer 106 via a standard network interface such as an Ethernet interface. Also depicted is a Personal Computer (PC) 106 having an address E. PC 106 represents a conventional DOCSIS user. This user simply uses one of the channels 102a-102N. In FIG. 5, the DOCSIS user is coupled to channel 102N. This conventional user plays no part in the FastChannel arrangement. It merely illustrates the co-existence of the FastChannel system and protocol with a conventional DOCSIS system and protocol.

Assume a packet 110 arrives via the router 92 at a tunnel 96. Tunnel 96 is connected to the CMTS via an interface having an IP address designated as T1. The packet 110 originated at a source with address S (identified with reference designator 10a in FIG. 5) and is destined to the PC 106 having an address D (identified with reference designator 110b in FIG. 5). It is further assumed in this example that address D is an element of address space F (i.e. a FastChannel address space).

The tunnel source 96 having the address T1 encapsulates the packet by creating a new packet 112, placing the original packet 110 in the payload field of the new packet 112, and adding a new packet header 114. In the new header 114, the source address is T1 (identified with reference designator 112a in FIG. 5) and destination address is one of a, b, . . . n, (identified with reference designator 112b in FIG. 5) which are separate IP interfaces on tunnel destination 104. It should be noted that destination addresses a, b, . . . n are part of L's address space and that each address pair (T1, a), (T1, b), etc. defines a separate tunnel. The CMTS 100 is configured such that the subnetwork address of which address a is a member, is mapped onto cable channel 102a; similarly b is mapped onto cable channel 102b, and so on; finally n is mapped onto cable channel 102N. The encapsulated packets are then routed via the appropriate tunnel to the tunnel destination 104. At the tunnel destination 104, the encapsulation headers are removed to again provide packet 110, and the packets are forwarded in their original order to the destination, which in this case is the PC 106.

The net effect of this procedure makes available the sum of the bandwidths of channels 102a through 102N to the path between source tunnel 96 and the destination tunnel 104. It should also be noted that the address allocation method of the present disclosure allows legacy DOCSIS users to share channels with FastChannel users. As depicted in FIG. 5, a PC 108 with address E (where E is in the L address space) is able to receive data addressed to it, while sharing channel 102N with the FastChannel-attached PC 106 with address D.

It should further be noted that it may be desirable to maintain the same (or even greater) ratio of upstream to downstream bandwidth for FastChannel as for legacy DOCSIS. One reason is the well known limiting effect that bandwidth asymmetry has on TCP performance. Hence the tunneling, encapsulation and channel combining procedures described above can also be applied to group together a corresponding set of upstream channels.

Figure 6:
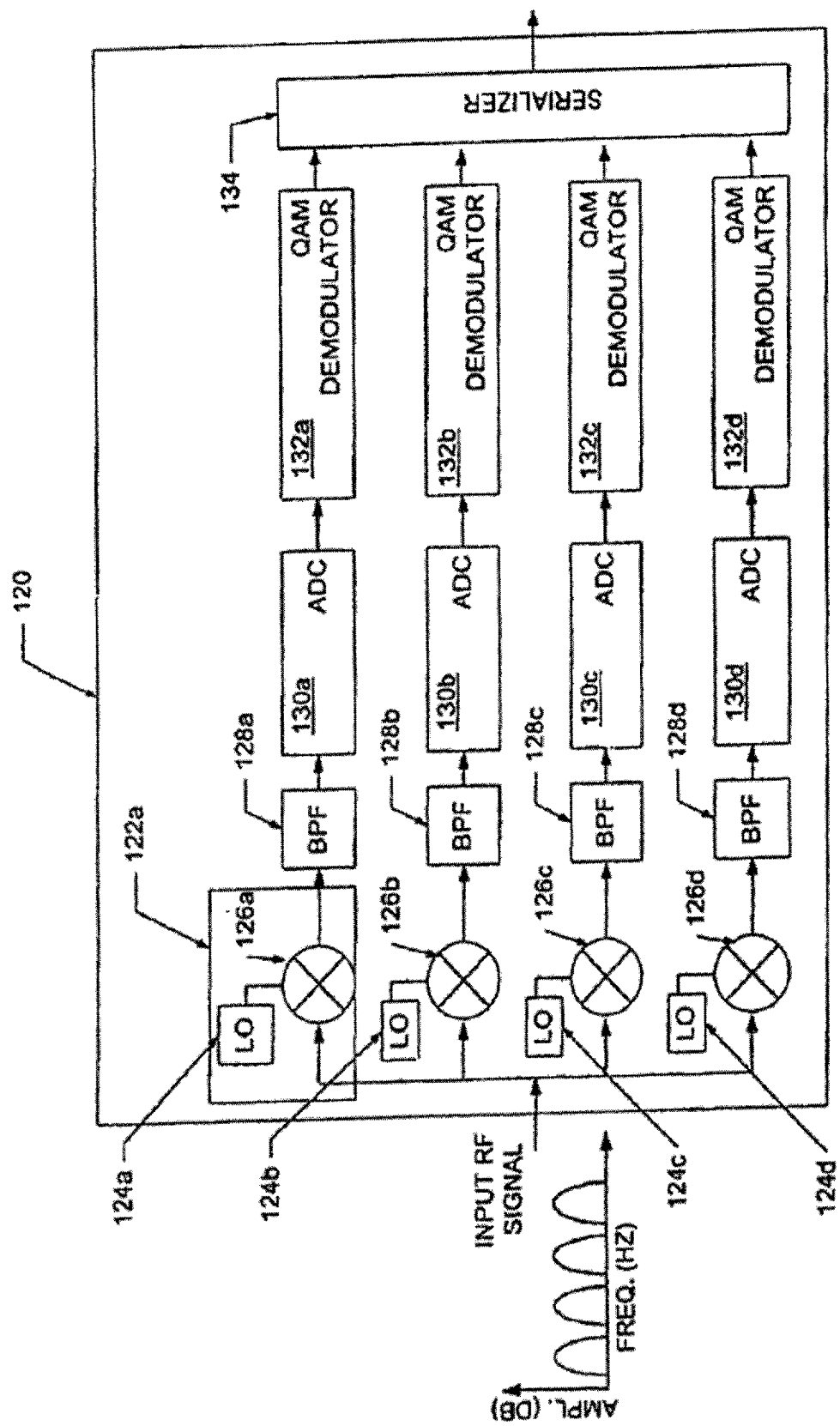
FIG. 6 is a block diagram of a demodulator portion of a FastChannel modem.

Referring now to FIG. 6, an alternate embodiment of a demodulator portion 120 of a FastChannel modem includes a plurality of tuners 122a-122d. Each of the tuners is provided from a respective one of a plurality of down converter modules 124a-124d having a respective one of a plurality of local oscillators (LO) 126a-126d coupled thereto. Taking tuner 122a as representative of tuners 122b-122d, the down converter module 124a receives RF signals at a first port thereof and an LO signal at a second port thereof and provides an output signal having a frequency equal to the difference between the frequencies of the RF signal and the LO signal.

The output signals from the tuners 122a-122d are provided to respective ones of filters 128a-128d with each of the filters having a band pass filter characteristic. The filtered signals are then fed to respective ones of a plurality of analog to digital converters (ADC) 130a-130d. The ADCs 130a-130d receive the analog signals at inputs thereof and provide at outputs thereof a stream of bits which represents the analog signal fed to each ADC.

The ADCs 130a-130d are followed by processors 132a-132d each of which perform a demodulation process, In one embodiment, processors 132a-132d perform 5 Msymbols/sec QAM demodulation. It should be understood that although multiple processors are shown, this does not mean that multiple integrated circuits would be required. The demodulators 132a-132d provide the filtered, demodulated signal to a serializer 134. Serializer 134 receives the signals in parallel from the demodulators 132a-132d and re-serializes the packets to provide a serial signal at an output port of the serializer 134.

The demodulator 120 illustrates one method for receiving FastChannel data when parallel transmission is used. It should be appreciated that in demodulator 120 multiple demodulators 132a-132d are used, and the output is combined in the serializer 134. The serializer would multiplex the received packets or frames. Such an approach should not require extensive buffering, since the headend controls the peak rate to each user. Such a demodulator can be readily implemented using currently available commercial components. An additional benefit of this approach is that any RF channels can be used, they need not be adjacent to one another. One drawback to this design is that it may be relatively expensive compared with an integrated, multiple-channel demodulator since it has more components, including multiple RF tuners and bandpass filters.

It has thus been recognized that a category of techniques exists that, in combination with protocols described above, can be used to improve the peak rate. This category includes those techniques that utilize parallel transmission. Employing parallel transmission over conventional Data Over Cable Standard Interface Specification (DOCSIS) protocol channels has the advantage of allowing users of the DOCSIS protocol as well as users of the protocols described above to simultaneously share the same channel. It has further been recognized that although a trade-off must be made between modem technology required for serial versus parallel transmission, comparisons between these two categories of technology reveal that the hardware for these two-types of modems will be similar at a future point in time. It has been further recognized that CATV network evolution, channel performance, and modem complexity should all play a role in choosing between the various approaches. From an IP networking perspective, it is simpler to provide a single "data link" below the IP layer. However, CATV evolution considerations favor the approach of transmitting the data over parallel RF channels.

Thus, a method of sending data from a transmit site to a receive site includes the steps of dividing a transmit data stream having a first bit rate into multiple data streams with each of the multiple data streams having a bit rate which is lower than the first bit rate, and transmitting each of the multiple data streams over a plurality of parallel RF channels wherein at least one of the RF channels serves a plurality of users. The method further includes the step of recombining the multiple data streams at the receive site to provide a receive data stream having a bit rate equal to the first bit rate. With this particular arrangement, a method that improves the peak data transmission rate from a headend to a subscriber is provided. The technique of the present disclosure improves the performance and efficiency of the network for transferring large files downstream by dividing the data and transmitting the data over parallel RF channels. Because the peak transmission rate of transmission control protocol/internet protocol (TCP/IP) in the downstream direction is affected by the performance of the upstream channel, and because additional upstream bandwidth may enable new services, the same principle can be applied to the upstream direction.

A system has also been disclosed for sending data from a transmit site to a receive site includes a router, a tunnel source coupled to the router, and means for providing packets over multiple channels to a tunneling destination which receives the packets over the multiple channels and serializes the packets. With this particular arrangement, a system for enabling a data service which allows users to utilize a connection having a speed that is higher than the speed allowed by the current DOCSIS protocol is provided. The system improves the performance and efficiency of the network for transferring large files downstream by dividing the data and transmitting the data in parallel over multiple channels. In a preferred embodiment, the channels are provided as multiple RF channels. Because the peak transmission rate of transmission control protocol/internet protocol (TCP/IP) in the downstream direction is affected by the performance of the upstream channel, and because additional upstream bandwidth may enable new services, same principle can be applied to the upstream direction.

A system has also been disclosed for transmitting signal packets from a source to two or more destinations includes a router having at least two address groups and a tunnel source having an input coupled to the router and having an output. A packet destination address for each signal packet is mapped to one of the at least two address groups in the router. Packets having an original destination address which belongs to the first address group are provided to the tunnel source. In response to the tunnel source receiving a packet having an original destination address which belongs to the first address group, the tunnel source assigns each packet it receives to one of a plurality of addresses, each address being associated with a tunnel destination address and each one of the tunnel destination addresses being mapped to one of a plurality of output channels. Packets having an original destination address that belongs to the second address group, on the other hand, are mapped onto a single output channel based upon their original address. With this particular arrangement, a system that automatically assigns messages to one of two address groups and that provides improved faster access is provided for destinations associated with the first group. The packets having the original destination address that belongs to the first address group are transmitted substantially simultaneously to the destination address via the plurality of output channels. At the destination address, the packets on each of the plurality of channels are combined.

All references cited herein are hereby incorporated herein by reference in their entirety.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. .sctn.1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   obtaining, at a cable modem termination system including a processor, a transmit stream from a router;
   identifying, at the cable modem termination system, a group of packets from the transmit stream;
   identifying, at the cable modem termination system, a destination Internet Protocol (IP) address for each of the group of packets resulting in a group of destination IP addresses;

dividing, at the cable modem termination system, the transmit stream into multiple data streams in response to determining, at the cable modem termination system, that each of the group of destination IP addresses are associated with an address space, the multiple data streams including at least a first data stream and a second data stream, wherein each of the multiple data streams has a lower bit rate than a bit rate of the transmit stream, wherein the address space is associated with a group of users, wherein the group of users are associated with a service that includes the dividing of the transmit stream into the multiple data streams;

detecting, at the cable modem termination system, a first available bandwidth for a first channel of a group of channels and detecting, at the cable modem termination system, a second available bandwidth for a second channel of the group of channels;

in response to the detecting of the first available bandwidth and the detecting of the second available bandwidth:

transmitting, via the cable modem termination system, the first data stream over at least the first channel of the group of channels, the group of channels supporting traffic to a plurality of destinations; and transmitting, via the cable modem termination system, the second data stream over at least the second channel of the group of channels, wherein the first channel and the second channel are frequency-division multiplexed channels.

2. The method of claim 1, further comprising receiving the transmit stream.

3. The method of claim 1, wherein first data is communicated to a first destination of the plurality of destinations via at least the first channel, and wherein second data is communicated to a second destination of the plurality of destinations via at least the second channel.

4. The method of claim 1, wherein at least one destination of the plurality of destinations includes a cable modem.

5. The method of claim 1, wherein the multiple data streams are recombinable to form a combined data stream, and wherein the combined data stream has a bit rate equal to the bit rate of the transmit stream.

6. The method of claim 1, wherein the first channel and the second channel are channels of a hybrid fiber coaxial network.

7. The method of claim 1, wherein the first channel and the second channel are channels of a coaxial network.

8. The method of claim 1, wherein the first channel is an orthogonal frequency division multiplexing channel.

9. The method of claim 1, wherein the first channel and the second channel are downstream channels.

10. The method of claim 1, wherein first packets of the first data stream and second packets of the second data stream include sequence numbers.

11. The method of claim 10, wherein the sequence numbers enable selective re-sequencing of the first packets and the second packets based on the sequence numbers at a destination device.

12. A cable modem termination system comprising:
a transmit device; and
a processing system including a processor coupled to the transmit device;
a memory that stores executable instructions that, when executed by the processing system, facilitate performance of operations, the operations including:
obtaining a transmit stream from a router;
identifying a group of packets from the transmit stream;
identifying a destination Internet Protocol (IP) address for each of the group of packets resulting in a group of destination IP addresses;
dividing the transmit stream into multiple data streams, the multiple data streams including a first data stream and a second data stream in response to determining that each of the group of destination IP addresses are associated with an address space, wherein each of the multiple data streams has a lower bit rate than a bit rate of the transmit stream, wherein the address space is associated with a group of users, wherein the group of users are associated with a service that includes the dividing of the transmit stream into the multiple data streams;
detecting a first available bandwidth for a first channel of a group of channels and detecting a second available bandwidth for a second channel of the group of channels;
in response to the detecting of the first available bandwidth and the detecting of the second available bandwidth:
causing the transmit device to transmit the first data stream over at least the first channel of the group of channels, the group of channels supporting traffic to a plurality of destinations; and
causing the transmit device to transmit the second data stream over at least the second channel of the group of channels, wherein the first channel and the second channel are frequency-division multiplexed channels.

13. The cable modem termination system of claim 12, wherein the first channel is an orthogonal frequency division multiplexing channel.

14. The cable modem termination system of claim 12, wherein the second channel is an orthogonal frequency division multiplexing channel.

15. The cable modem termination system of claim 12, wherein first packets of the first data stream and second packets of the second data stream include sequence numbers.

16. The cable modem termination system of claim 12, wherein the multiple data streams are recombinable to form a combined data stream, and wherein the combined data stream has a bit rate equal to the bit rate of the transmit stream.

17. A system comprising:
a processing system including a processor;
a memory that stores executable instructions that, when executed by the processing system, facilitate performance of operations, the operations comprising:
obtaining a transmit stream from a router;
identifying a group of packets from the transmit stream;
identifying a destination Internet Protocol (IP) address for each of the group of packets resulting in a group of destination IP addresses;
dividing the transmit stream into multiple data streams in response to determining that each of the group of destination IP addresses are associated with an address space, wherein each of the multiple data streams has a bit rate that is lower than a bit rate of the transmit stream, wherein the address space is associated with a group of users, wherein the group of users are associated with a service that includes the dividing of the transmit stream into the multiple data streams;
modulating, by a first communication component, a first data stream of the multiple data streams;

modulating, by a second communication component, a second data stream of the multiple data streams;

detecting a first available bandwidth for a first channel of a group of channels and detecting a second available bandwidth for a second channel of the group of channels; and in response to the detecting of the first available bandwidth and the detecting of the second available bandwidth, transmitting, by one or more transmitters, the first data stream over at least the first channel of the group of channels and transmitting the second data stream over at least the second channel of the group of channels, the group of channels supporting traffic to a plurality of destinations, wherein the first channel and the second channel are frequency-division multiplexed channels, wherein packets of the first data stream and the second data stream include sequence numbers, and wherein the multiple data streams are recombinable to form a combined data stream that has a bit rate equal to the bit rate of the transmit stream.

18. The system of claim 17, wherein the first channel and the second channel are channels of a hybrid fiber coaxial network or a coaxial network.

19. The system of claim 17, wherein at least one of the first channel or the second channel is an orthogonal frequency division multiplexing channel.

20. The system of claim 17, wherein the first communication component comprises a modulator.

\* \* \* \* \*